(12) United States Patent
Wicker

(10) Patent No.: US 10,031,333 B2
(45) Date of Patent: Jul. 24, 2018

(54) ARRANGEMENT FOR CORRECTING ABERRATIONS ON A MICROSCOPE

(71) Applicant: Carl Zeiss Microscopy GmbH, Jena (DE)

(72) Inventor: Kai Wicker, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 123 days.

(21) Appl. No.: 15/135,912

(22) Filed: Apr. 22, 2016

(65) Prior Publication Data

US 2016/0320614 A1    Nov. 3, 2016

(30) Foreign Application Priority Data

Apr. 30, 2015    (DE) .................. 10 2015 207 972

(51) Int. Cl.
| | | |
|---|---|---|
| *G02B 21/00* | (2006.01) |
| *G02B 27/00* | (2006.01) |
| *G02B 27/10* | (2006.01) |
| *G02B 3/00* | (2006.01) |
| *G02B 26/06* | (2006.01) |
| *G02B 26/08* | (2006.01) |

(52) U.S. Cl.
CPC ......... *G02B 27/0068* (2013.01); *G02B 21/00* (2013.01); *G02B 27/1066* (2013.01); *G02B 3/0006* (2013.01); *G02B 21/002* (2013.01); *G02B 26/06* (2013.01); *G02B 26/08* (2013.01); *G02B 27/0025* (2013.01)

(58) Field of Classification Search
CPC .... G02B 13/0095; G02B 13/22; G02B 21/00; G02B 21/0004; G02B 21/002; G02B 21/0032; G02B 21/0052; G02B 21/006; G02B 21/0072; G02B 21/0076; G02B 21/36; G02B 21/361
USPC ........ 359/368, 362, 363, 369, 385, 389, 434
See application file for complete search history.

(56) References Cited

U.S. PATENT DOCUMENTS 6,288,382 B1    9/2001  Ishihara
6,578,963 B2 *  6/2003  Pettit .................... A61B 3/1015
                                                351/212

(Continued)

OTHER PUBLICATIONS

German Search Report for application No. 10 2015 207 972.4, dated Dec. 10, 2015 (10 pages); and English Translation of same (11 pages).

*Primary Examiner* — Arnel C Lavarias
(74) *Attorney, Agent, or Firm* — Patterson Thuente Pedersen, P.A.

(57) ABSTRACT

An arrangement for correcting aberrations of a specimen surface that vary across the visual field on a microscope, including a lens, a tubular lens, an imaging optics element, a pupil stop disposed in the beam path, and at least one optical element for optical-geometric separation of different image field regions. The optical element for optical-geometric separation of different image field regions is arranged in or near the intermediate image plane. Each individual element of the optical element for optical-geometric separation of different image field regions performs a pupil imaging, defined by the dimensions of the covered area of the intermediate image, such that a distribution of sub-pupils occurs, wherein each sub-pupil is allocated to the angle distribution from the associated image field region.

16 Claims, 3 Drawing Sheets

(56) References Cited

U.S. PATENT DOCUMENTS 9,046,422 B2 * 6/2015 Kudenov ............... G01J 3/447
2008/0266655 A1   10/2008 Levoy et al.

* cited by examiner

ARRANGEMENT FOR CORRECTING ABERRATIONS ON A MICROSCOPE

RELATED APPLICATIONS

The present application claims priority to German Application No. 102015207972.4, filed Apr. 30, 2015, said application being incorporated herein in its entirety by reference.

TECHNICAL FIELD

The invention relates to an arrangement for correcting aberrations of a specimen surface that vary across the visual field on a microscope, especially on a wide-field microscope, including a lens, a tubular lens, and an imaging optics element, wherein a pupil stop and at least one optical element for optical-geometric separation of different image field regions and an adaptive element are arranged in the beam path.

BACKGROUND

Aberrations in a microscope and specimen have a negative effect on microscopic imaging. As is known, these aberrations may be corrected using adaptive optics in the pupil plane. However, this is only true for wide-field imaging under certain conditions. In this case, it is not possible to optimally correct aberrations that vary across the image field, since the pupil in which the correcting elements are normally placed is the same for all image areas.

Known techniques for correcting aberrations using adaptive optics are employed inter alia in laser scanning microscopy, wherein the adaptive optics may be adjusted for different scan positions. Local image regions are positioned by the scan and may be corrected in the pupil plane in temporal sequence.

According to the solutions of the prior art, for wide-field microscopy the technique is possible only for correcting the mean errors across the entire image field. Thus although an improvement of individual regions is possible, this is at the cost of a worsened image correction in the other areas.

In "Multiple-Field Approach for Aberration Correction in Miniature Imaging Systems Based of Wafer-Level Production" (Eric Logean et al in Proc. SPIE 8667, 1913), a solution is presented in which a plurality of lenses having different focal lengths are used in order to correct field-related defocus terms in non-planar-corrected imaging systems. This solution has the disadvantage that only a deterministic system correction is possible. Adaptively changeable specimen aberrations cannot be corrected.

Proceeding from the disadvantages of the solutions in the prior art, the underlying object of the invention is to refine an arrangement for correcting aberrations across an extended image field on a microscope, which arrangement permits improved corrections of aberrations for wide-field microscopy, even across large image areas, and may also be used in scanning microscopes at high scan speeds.

In accordance with the invention, this object is attained with an arrangement of the type described in the foregoing using the features of patent claim 1. Advantageous embodiments are provided in subordinate claims 2 through 11.

In accordance with the invention, the pupil stop is disposed between the lens and the tubular lens unit. The optical element for optical-geometric separation of different image field regions is arranged in or near the intermediate image plane, wherein each individual element of the optical element for optical-geometric separation of different image field regions performs a pupil imaging, defined by the dimensions of the covered area of the intermediate image, and undertaken using at least one pupil imaging lens that may be part of the element for optical-geometric separation, so that a distribution of sub-pupils occurs. Each sub-pupil is allocated to the angle distribution from the associated image field region.

In one advantageous embodiment, the optical element for optical-geometrical separation of different image field regions is embodied as a lens array.

In another advantageous embodiment, the optical element for optical-geometric separation of different image field regions is to be embodied as a deflection element array, wherein in this case blazed gratings, the grating constant and/or blaze angle of which are different for different image field regions, or facet mirrors having different angles of incidence for the different image field regions are possible.

When using blazed gratings, an element for correcting chromatic errors that occur due to the wavelength dependence on the deflection is also necessary.

The arrangement may be coupled both to a wide-field microscope and to a scanning microscope.

Thus it is possible to separate and allocate the pupils to different image areas, so that the arrangement permits individual and yet simultaneous correction.

SUMMARY

With respect to the prior art, the inventive arrangement permits the pupil to be split into a plurality of individual pupils that belong to different image field regions.

The aberration correction for wide-field microscopes is improved across large image areas.

The aberrations in scanning microscopes may also be corrected with the inventive arrangement when the illumination beam is conducted via the element. This permits corrections at high scan speeds that are too rapid for active adjustments of the adaptive optics. In one advantageous embodiment, for the purposes of correcting the sub-pupils, an adaptive element is arranged between the optical element for optical-geometric separation of different image field regions, which is arranged in the intermediate image plane, and the imaging optics element. The adaptive optical element is disposed in the sub-pupil plane and corrects region-related aberrations.

The sub-pupil plane is a plane in which a plurality of pupils that each belong to different image regions are embodied adjacent to one another.

Then, using additional individual elements and an additional optical element, or even the same optical element, for optical-geometric separation of different image field regions, the sub-pupils are then re-converted to an image that may then be imaged on a camera.

An SLM (spatial light modulator), for instance, may be used for the adaptive optical element.

It is furthermore advantageous that, for the purposes of correcting known (fixed) aberrations, a non-adaptive element is disposed between the optical element for optical-geometric separation of different image field regions, which arranged in the intermediate image plane, and the imaging optics element. Only fixed aberrations of the optical system, that is, known aberrations, may be corrected with this non-adaptive element.

If there is a desire to correct aberrations that are variable across the field, as well, this element must also be disposed in or near a sub-pupil plane. If there is a desire to correct aberrations that remain the same across the field, this element should be disposed in a pupil plane.

For the purposes of converting the sub-pupils into image elements, in one advantageous embodiment a second optical element for optical-geometric separation of different image field regions is arranged between the imaging optics element and the image plane.

Furthermore, it is advantageous when, for the purposes of converting the sub-pupils into image elements, the image passes, at least twice, through the optical element for optical-geometric separation of different image field regions that is arranged in the intermediate image plane.

Thus there are two alternatives available from the aforementioned advantageous embodiments. When using lens arrays, it should be established that they do not necessarily have a fill factor of 100%, so that there may be dark parts between the image regions. This may be prevented in that the lens array is not exactly in the image plane, but instead is added slightly defocused.

Using the depth of field, therefore, there is a slight overlap of the image regions on the lens array. The sub-pupils, as well, can no longer be perfectly allocated to the specific image regions, but this may even be advantageous because it is possible that a soft transition from the aberration correction of an image region may be realized.

The above summary is not intended to describe each illustrated embodiment or every implementation of the subject matter hereof. The figures and the detailed description that follow more particularly exemplify various embodiments.

BRIEF DESCRIPTION OF THE DRAWINGS

The inventive arrangement is described in greater detail in the following using exemplary embodiments, in which.

Figure 1:
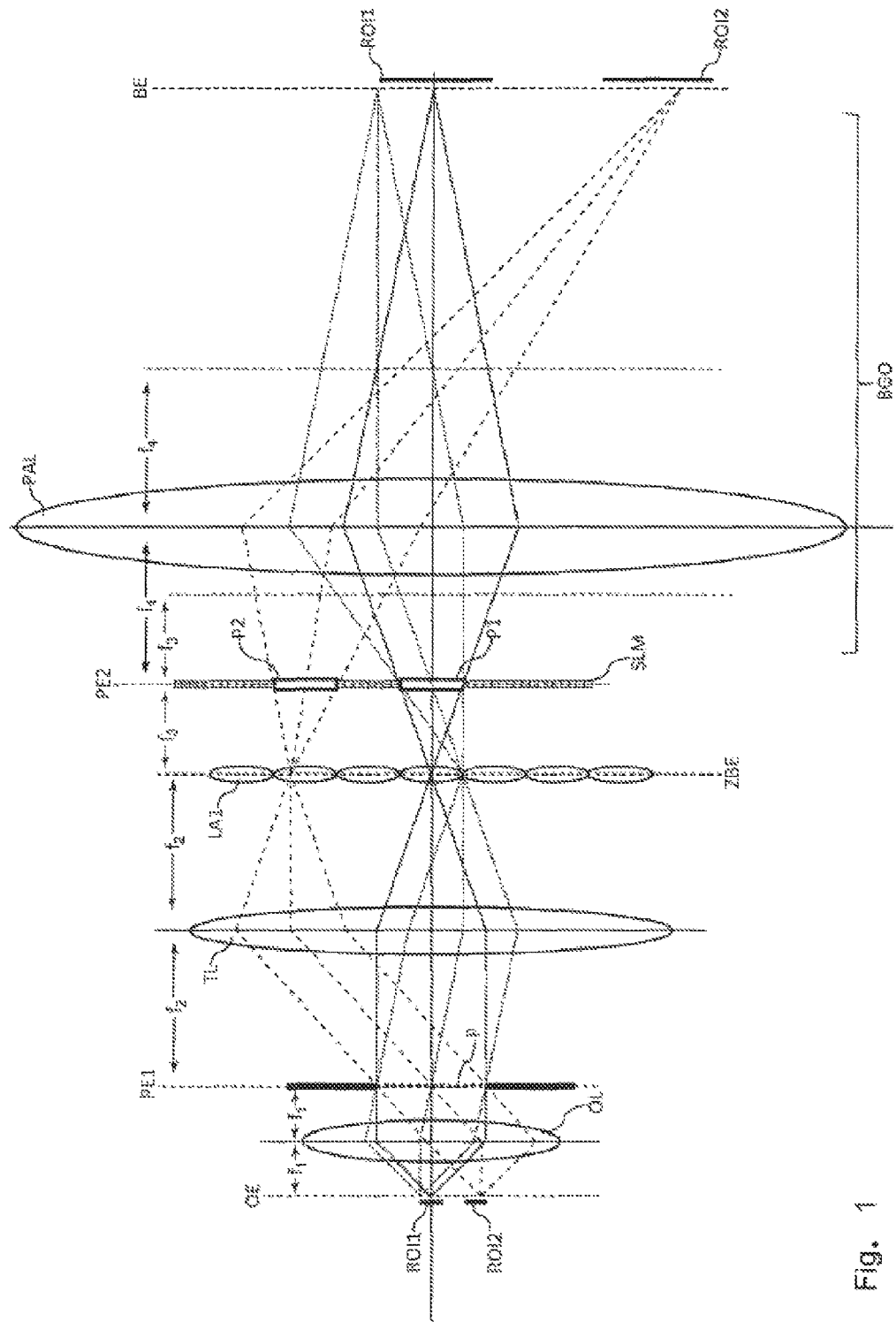
FIG. 1 is a schematic depiction of the arrangement having a lens array.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

Figure 2:
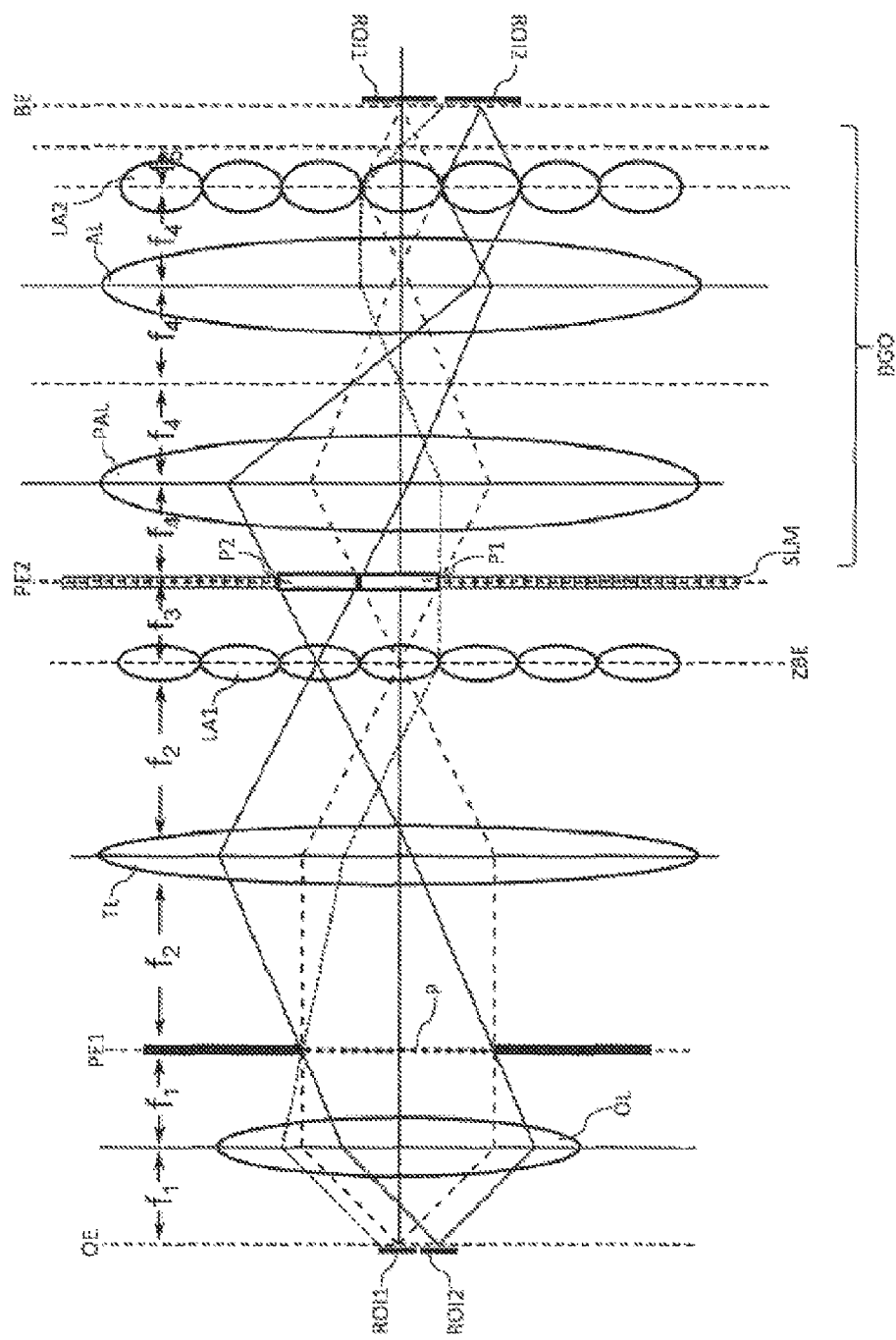
FIG. 2 is a schematic depiction of the arrangement having two lens arrays.

FIG. 1 illustrates the arrangement, proceeding from the object plane OE, having an object lens OL, a pupil plane PE1, a tubular lens TL, a lens array LA1, the pupil plane PE2, a pupil imaging lens PAL, and the image plane BE. The lens array LA1 is disposed in the intermediate image plane ZBE or at least in the vicinity thereof. Furthermore, focal lengths f1 through f4 are depicted in FIG. 2. In the sub-pupil plane PE2, the lens array LA1 divides the pupil P into sub-pupils P1 and P2 belonging to different image regions ROI1 and ROI2. The image field regions ROI1 and ROI2 in this case are depicted merely as examples, since when aberrations are corrected, any desired number of image field regions may be created, depending on the application.

An adaptive element SLM, arranged in the sub-pupil plane PE2, corrects region-related aberrations. Alternatively (or even additionally), however, a non-adaptive element (not shown) may also be added, which then, however, can only correct fixed aberrations of the optical system, that is, unchangeable aberrations of the optical system.

The imaging optics element BGO transforms the sub-pupil plane PE2 back into the image plane BE.

FIG. 2 depicts the arrangement having an additional lens array LA2 and an imaging lens AL, with another focal length f5. The other reference numbers are identical to those from FIG. 1.

The effect of the second lens array LA2 may in principle also be replaced by a second pass through the first lens array LA1.

The illustrated system rotates every sub-region of the image by 180 degrees without changing its relative position to the other regions. This destroys the continuity of the image. However, this continuity may be restored on a computer after the image is recorded.

However, such an arrangement would be less suitable for observation through an ocular. This rotation may be optically reversed again by imaging with two additional lens arrays (or the like).

Figure 3:
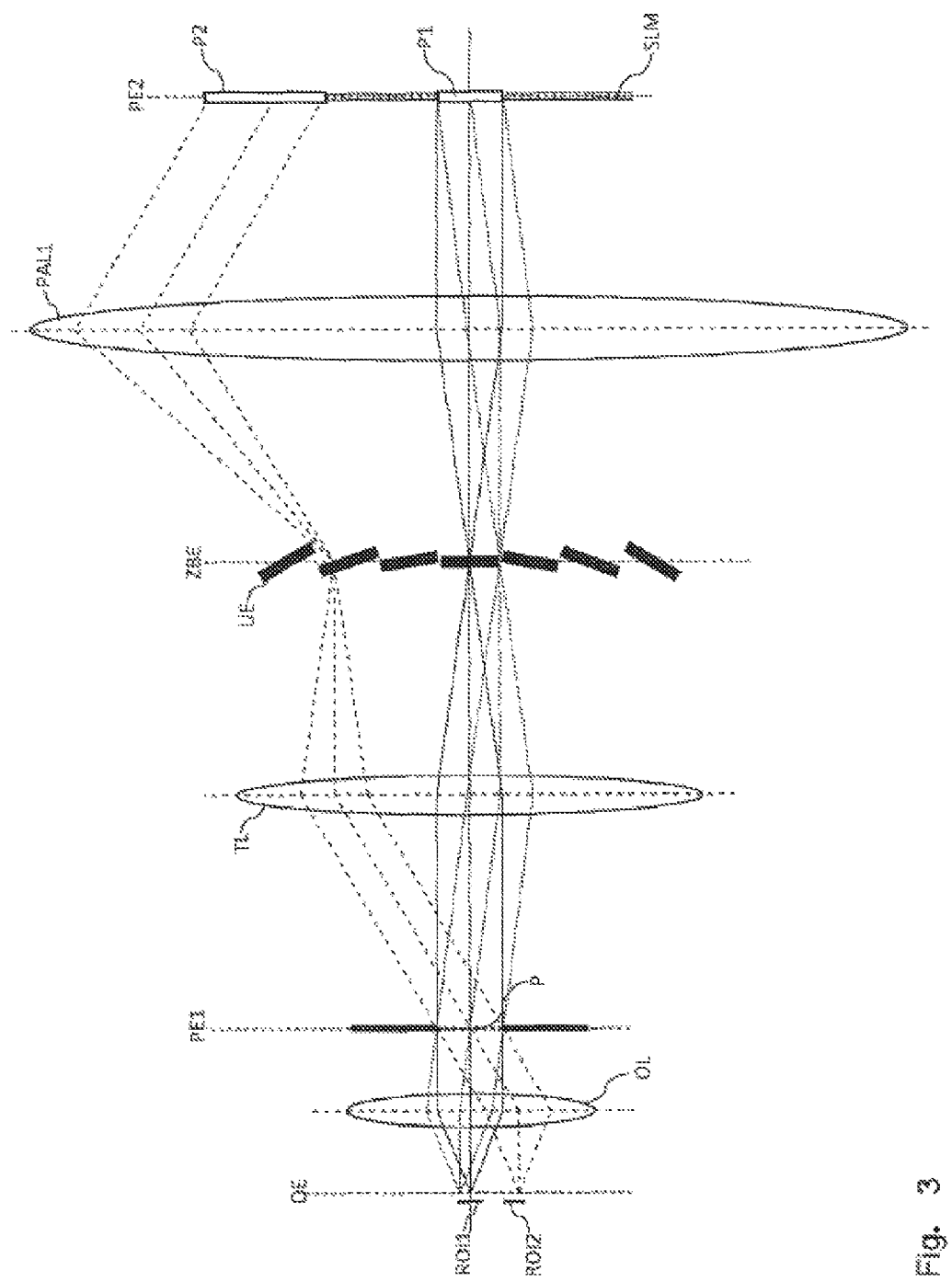
FIG. 3 is a schematic depiction of a sub-arrangement without imaging optics element having a deflection element array in the intermediate image plane.

FIG. 3 depicts the inventive arrangement with a deflection element array UE as the optical element for optical-geometric separation of different image field regions ROI1, ROI2 into associated sub-pupils P1 and P2 in the sub-pupil plane PE2.

The pupil imaging lens PAL1, in combination with the deflection element array UE, has the same effect as the lens arrays from FIGS. 1 and 2.

Additional reference numbers are identical to those from FIG. 1. The imaging optics element required for imaging is not shown in FIG. 3.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

REFERENCE LIST

OE Object plane
BE Image plane
OL Objective lens
TL Tubular lens
PAL, PAL1 Pupil imaging lens
AL Imaging lens
PE1 Pupil plane
PE2 Sub-pupil plane
P Pupil
P1, P2 Sub-pupil
LA1, LA2 Lens array
ZBE Intermediate imaging plane
SLM Adaptive element
ROI1, ROI2 Image field region
BTO Imaging optics element

The invention claimed is:

1. A system for correcting aberrations of a specimen surface that vary across a visual field on a microscope, the system comprising a lens, a tubular lens, an imaging optics element, a pupil stop disposed in a beam path, and at least one optical element for optical-geometric separation of different image field regions, said optical element for optical-geometric separation of different image field regions being arranged in or near an intermediate image plane and wherein each individual element of the optical element for optical-geometric separation of different image field regions performs a pupil imaging defined by dimensions of a covered area of the intermediate image, such that a distribution of sub-pupils occurs, wherein each sub-pupil is allocated to an angle distribution from the associated image field region, the system further comprising an adaptive element arranged between the optical element for optical-geometric separation of different image field regions and the imaging optics element.

2. The system of claim 1, wherein the optical element for optical-geometric separation of different image field regions is a lens array.

3. The system of claim 1, wherein the optical element for optical-geometric separation of different image field regions is a deflection element array.

4. The system of claim 3, wherein the deflection element array is a blazed grating, a grating constant or a blaze angle of which are different for different image field regions, and further comprising an element for correcting chromatic errors.

5. The system of claim 3, wherein the deflection element array is a facet mirror having different angles of incidence for the different image field regions.

6. The system of claim 1, further comprising a wide-field microscope.

7. The system of claim 1, further comprising a scanning microscope.

8. The system of claim 1, wherein a second optical element for optical-geometric separation of different image regions is arranged between the imaging optics element and the image plane.

9. The system of claim 1, wherein an image passes, at least twice, through the optical element for optical-geometric separation of different image regions, and wherein the optical element for optical-geometric separation of different image regions is arranged in the intermediate image plane.

10. A system for correcting aberrations of a specimen surface that vary across the visual field on a microscope, the system comprising a lens, a tubular lens, an imaging optics element, a pupil stop disposed in a beam path, and at least one optical element for optical-geometric separation of different image field regions, said optical element for optical-geometric separation of different image field regions being arranged in or near an intermediate image plane and wherein each individual element of the optical element for optical-geometric separation of different image field regions performs a pupil imaging defined by dimensions of a covered area of the intermediate image, such that a distribution of sub-pupils occurs, wherein each sub-pupil is allocated to an angle distribution from the associated image field region, the system further comprising a non-adaptive element arranged between the optical element for optical-geometric separation of different image field regions and the imaging optics element.

11. The system of claim 10, wherein the optical element for optical-geometric separation of different image field regions is a lens array.

12. The system of claim 10, wherein the optical element for optical-geometric separation of different image field regions is a deflection element array.

13. The system of claim 12, wherein the deflection element array is a blazed grating, a grating constant or blaze angle of which are different for different image field regions, and further comprising an element for correcting chromatic errors.

14. The system of claim 12, wherein the deflection element array is a facet mirror having different angles of incidence for the different image field regions.

15. The system of claim 10, further comprising a wide-field microscope.

16. The system of claim 10, further comprising a scanning microscope.

* * * * *